Oct. 3, 1961 W. C. N. HOPKINS 3,002,269
METHOD OF FORMING BALL AND SOCKET
JOINTS IN METAL TUBULAR MEMBERS
Filed Jan. 9, 1959 3 Sheets-Sheet 1
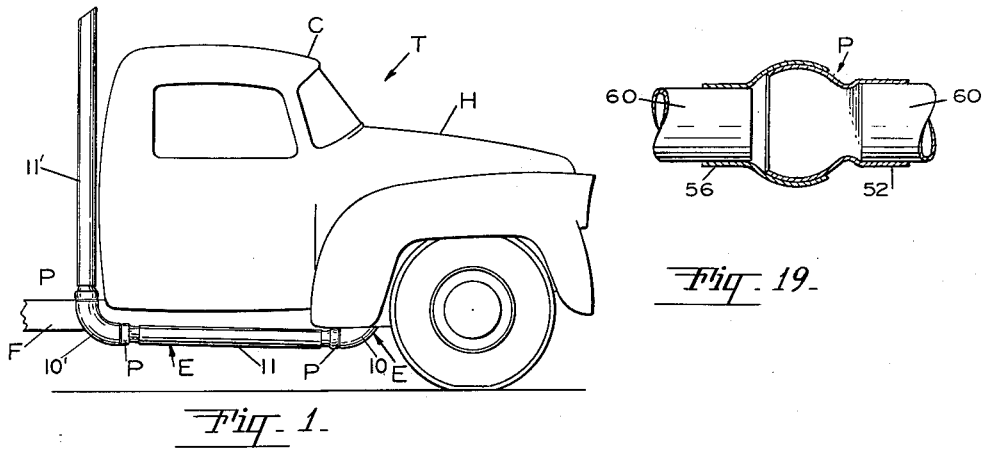
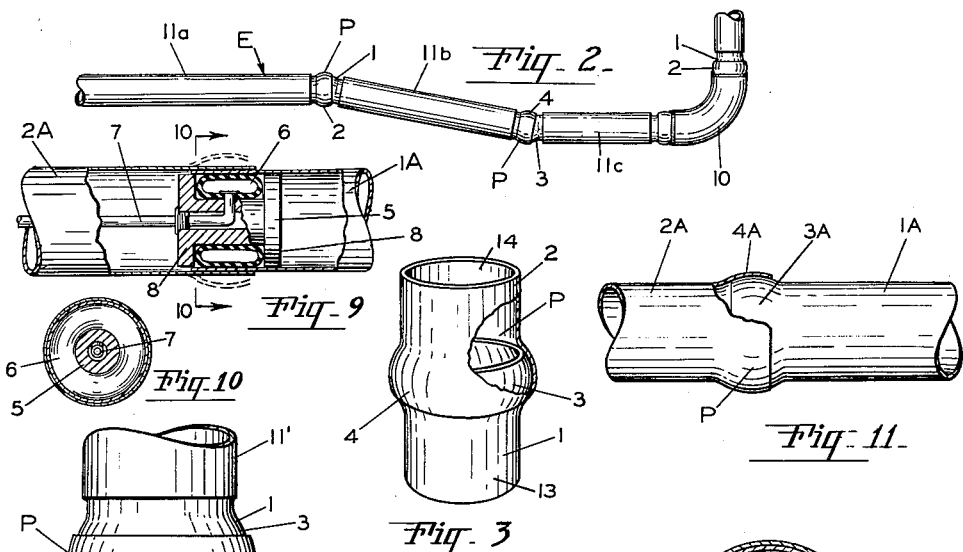
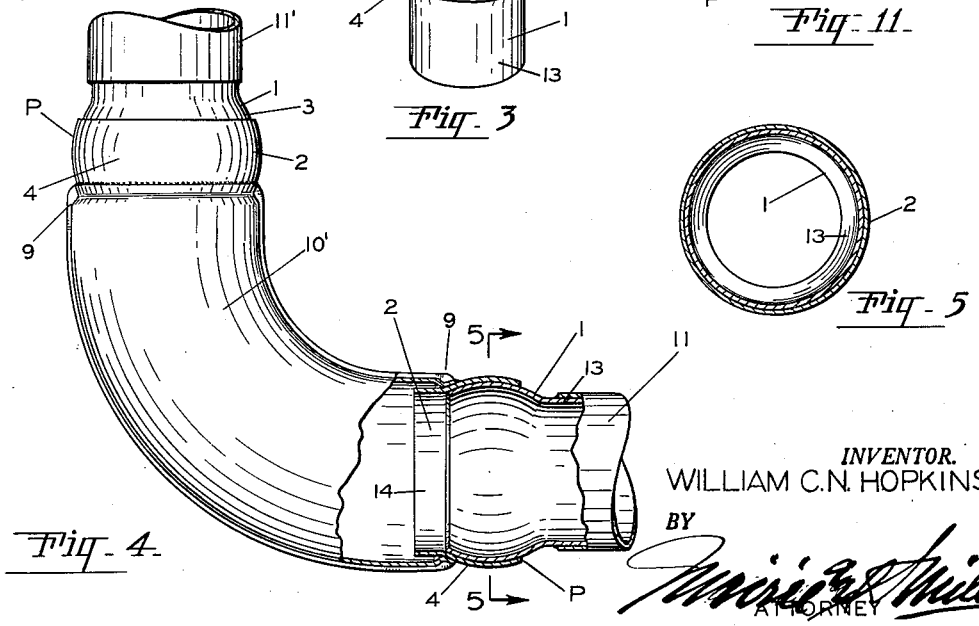
INVENTOR.
WILLIAM C. N. HOPKINS

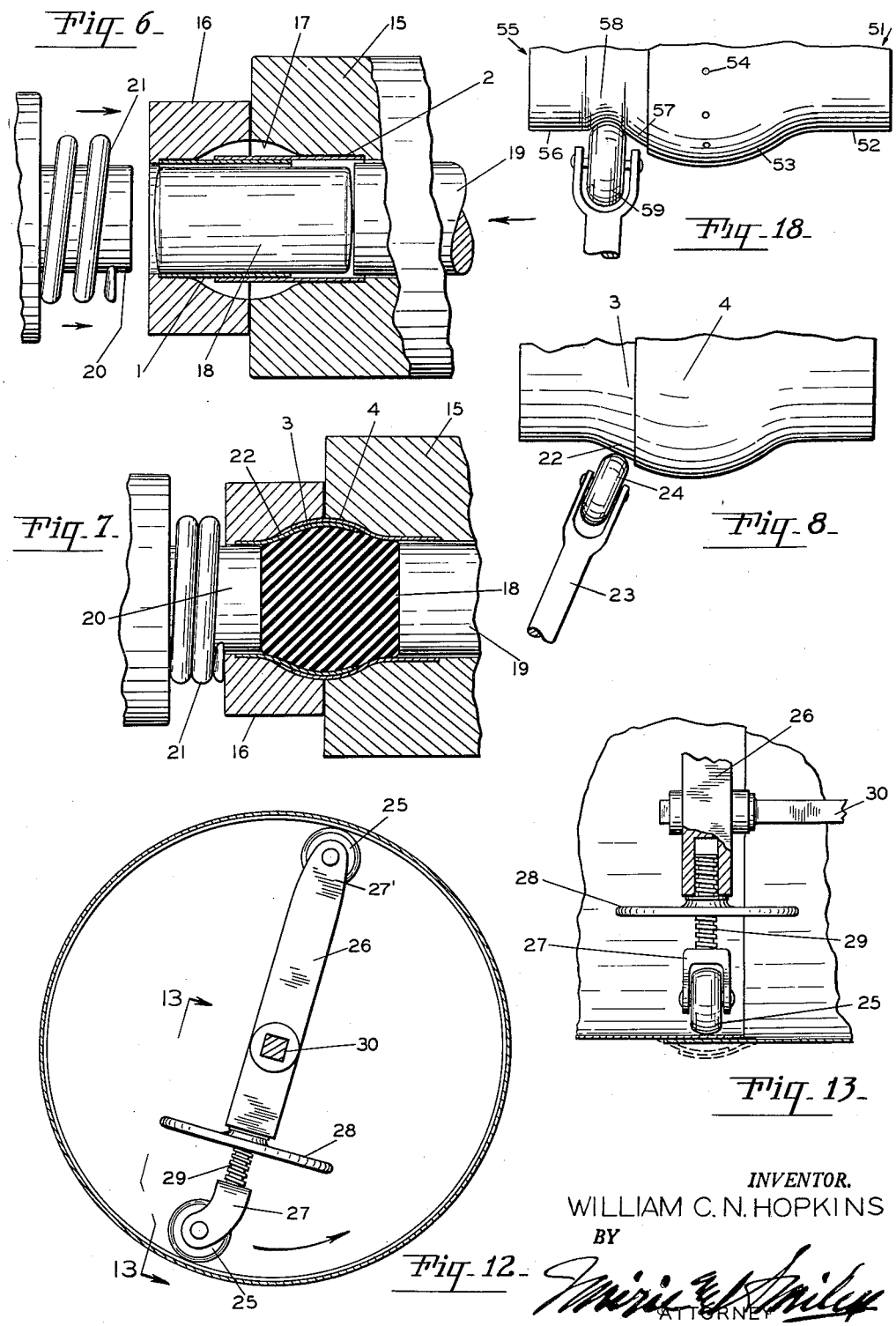

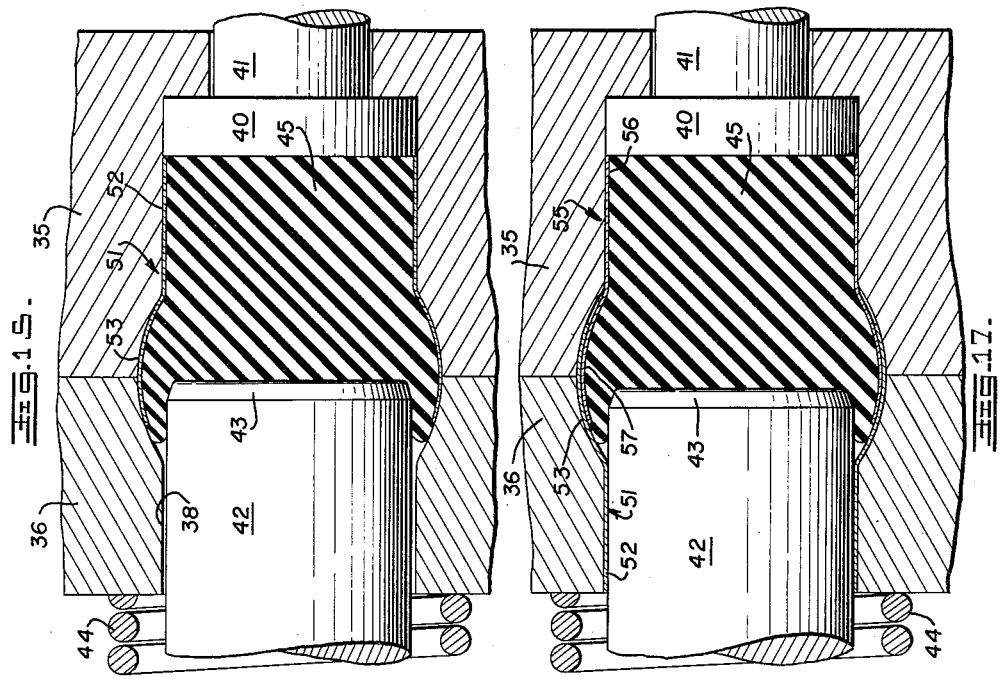
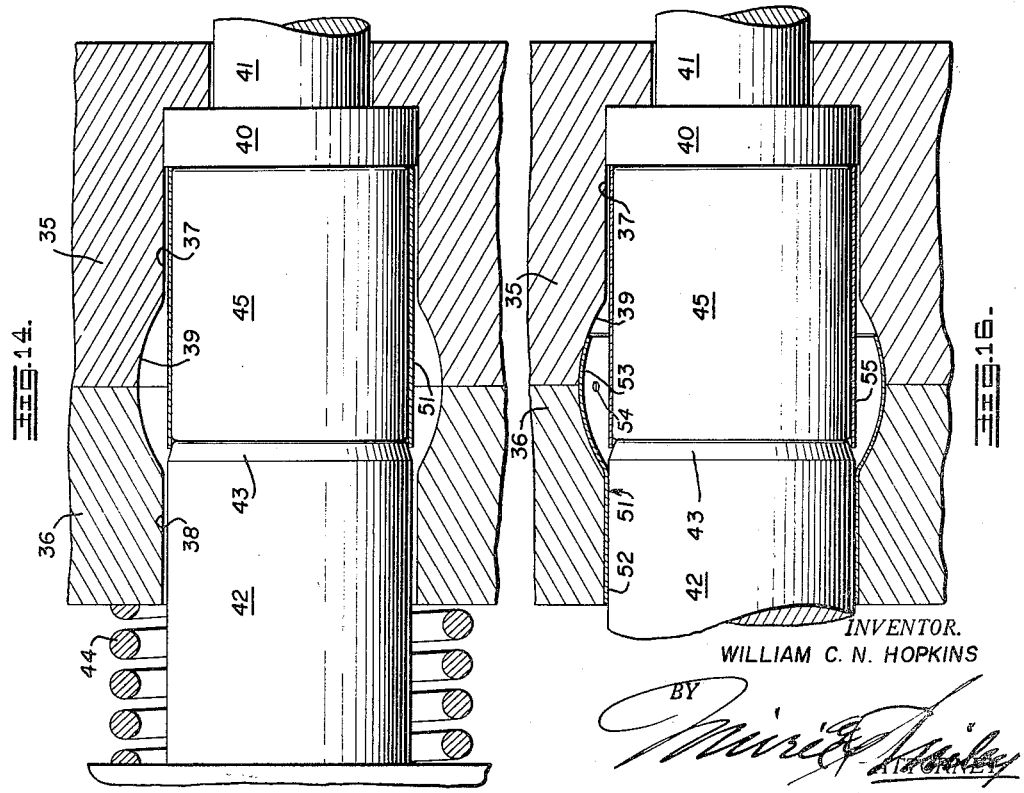

United States Patent Office 3,002,269
Patented Oct. 3, 1961

3,002,269
METHOD OF FORMING BALL AND SOCKET
JOINTS IN METAL TUBULAR MEMBERS
William C. N. Hopkins, 1532 SE. 3rd Ave.,
Portland, Oreg.
Filed Jan. 9, 1959, Ser. No. 785,837
10 Claims. (Cl. 29—441)

This invention relates to ball and socket joints, connecting pipes or other tubular members, and more particularly to the method of forming such joints especially in exhaust pipes for motor vehicles. This application is a continuation-in-part of application Serial No. 524,708, filed July 27, 1955, now abandoned.

In motor vehicles, especially large trucks, the exhaust pipes usually extend from the engine and beneath the frame to a point immediately behind the operator's cab and then extend vertically behind the cab to discharge at a point above the truck body. These exhaust pipes are usually of large diameter and are relatively inflexible whereas there may be a movement of several inches between the engine and the spring supported frame and cab to which the riser is attached.

To accommodate the exhaust pipe to this relative movement, it has been the practice to insert a section of flexible pipe in the exhaust line but this is not satisfactory because the flexible pipe develops excessive leakage in a matter of weeks due to wear, rust, high temperatures and the like. Alternatively, it has been proposed to insert movable joints in the pipe but it has been necessary to cast and machine such joints so that costs are excessive and, heretofore, no practical method of forming such joints from pipe sections has been developed.

Having in mind the defects of the prior art, it is the primary object of the present invention to provide a novel method of forming ball and socket connections between adjacent pipe sections to provide a tight seal between the socket and the ball without the the use of sealing gaskets or retaining rings for holding the same together.

Another object of the invention is to provide a ball and socket coupling particularly adapted for connecting sections of exhaust pipe on motor vehicles.

A further object of the invention is to provide a method of making universal pipe couplings for connecting sections of exhaust pipe on motor vehicles and the like.

Still another object of the invention is to provide a method of making universal pipe joints having simplicity, economy and efficiency.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 1 is a fragmentary side view in elevation of a typical exhaust pipe on a motor vehicle utilizing the ball and socket coupling of the invention;

FIG. 2 is an enlarged fragmentary view in elevation of an exhaust pipe incorporating the ball and socket coupling according to the present invention;

FIG. 3 is a perspective view of a ball and socket fitting embodying the principles of the invention, partially broken away for convenience of illustration;

FIG. 4 is an enlarged side view in elevation of an elbow connection between pipe sections utilizing the ball and socket coupling of the present invention;

FIG. 5 is a cross-sectional view, taken on the plane of section line 5—5 of FIG. 4;

FIGS. 6 and 7 are cross-sectional views through a suitable die apparatus for forming the ball and socket coupling;

FIG. 8 is a fragmentary view in elevation of apparatus for finishing the ball and socket coupling;

FIG. 9 is a cross-sectional view through a modified apparatus for forming the ball and socket in a pipe line;

FIG. 10 is a cross-sectional view, taken on line 10—10 of FIG. 9;

FIG. 11 is a view in elevation of a ball and socket connection formed directly between joining sections of a continuous pipe line by the apparatus shown in FIGS. 9 and 10;

FIG. 12 is a cross-sectional view through tubular members within which is shown another form of apparatus for forming the ball and socket by a rolling method;

FIG. 13 is a sectional view, taken on line 13—13 of FIG. 12;

FIGS. 14 through 17 are cross-sectional views through a die forming apparatus similar to that shown in FIGS. 6 and 7, and illustrating the steps of forming the connection according to a preferred method;

FIG. 18 is a fragmentary view in elevation of finishing apparatus similar to that shown in FIG. 8 and illustrating the final step in the preferred method, and FIG. 19 is a cross-sectional view taken axially through a finished connection formed according to the preferred method.

Referring now more particularly to the drawings, specifically to FIG. 1, the exhaust pipe E of a truck T usually extends from a rigidly mounted engine under the hood H of the cab C, beneath the spring mounted frame F and then vertically behind the cab C. The exhaust pipe E may include an elbow 10 connected to the engine, a generally horizontal section 11 extending beneath the frame F a riser 11′ behind the cab C and an elbow 10′ connecting the section 11 and riser 11′.

Due to the spring mounting of the frame F, there may be a movement of several inches between the engine or the elbow 10, which may be rigidly positioned, and the riser 11′. To accommodate this relative movement, the elbows 10 and 10′ may be connected to the section 11 and riser 11′ by ball and socket connections P. If desired, as shown in FIG. 2, the horizontal section 11 may be subdivided into a plurality of sections 11a, 11b and 11c, of any desired number and connected by the ball and socket connections P.

As shown in FIG. 3, the ball and socket connections P may comprise tubular members or pipe sections 1 and 2 having overlapped end portions 3 and 4 which are spherically expanded to form a tight but movable ball and socket joint, leaving sleeve portions 13 and 14 for attachment to the adjoining portions of an exhaust line. For example, as shown in FIG. 4, the sleeve portion 13 of the connector section 1 may be secured in the end of the horizontal exhaust section 11, and the sleeve portion 14 of connector section 2 may be fixed in the end 9 of the elbow 10′.

The ball and socket coupling P of FIG. 3 may be formed, as shown in FIGS. 6 and 7, by placing the coupling sleeve 2 within the forming die 15 while the sleeve 1 is inserted within the nipple 2 and within the forming die 16. The dies 15 and 16 are cored out to form a spherical cavity 17. Inserted within the sleeves is a compressible, radially expandible element 18, as for instance rubber. A plunger 19 has the forming die 15 slidably mounted thereon. A ram plunger 20 is movable relative to the die 16. A spring element 21 surrounds the plunger 20 and is adapted to engage the face of the die 16 when the ram 19 and plunger 20 are moved in the direction of the arrows. This spring holds the die 16 against the face of the die 15 while the plunger 20 contacts the end of the compressible element 18, radially expanding the same to the position shown in FIG. 7, forming the ball 3 on the end of the sleeve 1 and the socket on the end of the sleeve 2 within the cavity 17 of the dies 15 and 16.

As the compressible element 18 expands, the ball and the socket are tightly formed together, making them leakproof without the use of any gaskets. In the forming of the ball 3, it has been found that the portion 22 has a tendency to expand beyond the end of the socket 4 forming a ridge. In order to eliminate this ridge, the sleeves are chucked within a lathe and the tool 23 having the roller 24 is engaged against the portion 22 realigning the same so that the ball and socket can operate. It will be seen that the spherically deformed portion extends throughout the overlap and beyond the ends of the telescoping portions with the maximum transverse diameter intermediate the telescoped ends, and said ends having a diameter intermediate said maximum diameter and the minimum transverse diameter at the juncture of the spherically deformed portions 3 and 4 and the adjoining tubular portions 13 and 14, the inner telescoped portion 3 being snugly engaged spherically within the outer telescoped portion 4 to form a sealed metal-to-metal universal swivel connection.

This ball and socket joint P may also be formed directly between sections 1A and 2A of a relatively large diameter pipe as shown in FIGS. 9–11. The ball portion 3A of the joint is formed on the end of the pipe 1A and the socket portion 4A is formed on the end of the pipe 2A. According to this method, a device consisting of a spool 5 surrounded by a flexible hollow rubber tube 6 is inserted in the male section 1A of the pipe. High pressure hydraulic fluid is pumped into this tube by way of the conduit 7 connected to the stem of the tube 6 through an axial bore through the cylindrical body of the spool 5 and into which the stem radially projects.

With the tube 6 deflated, the pipe 1A is slipped over the annular end flanges 8 of the spool 5 which confine the tube 6 to radially outward expansion after which the pipe 2A is forced over the end of the pipe 1A or vice versa. Then high pressure hydraulic fluid is forced into the tube 6 by way of the fitting 7 expanding the said tube against the tube wall of section 1A forming the ball 3A and the socket 4A, one within the other. When the ball and socket joint has been formed and the hydraulic pressure has been released from the tube 6, the tube 6 and spool 5 can then be removed from the pipe line or to the next length of pipe to be connected therewith. When the ball and socket joints are formed in this manner, they are formed tightly together to form a fluid tight seal, while still providing a flexible joint.

Another method of forming the ball and socket joint on large pipe lines is illustrated in FIGS. 12 and 13 wherein the same as formed by the rollers 25 which are rotatably mounted on a crossbar 26 by yokes 27, 27′, the yoke 27 being mounted on the end of a shaft 29 threaded in the bar 26. A hand wheel 28 on the threaded shaft 29 extends the element 27 as the bar 26 is revolved by the drive shaft 30 running longitudinally of the pipe line. While but two rollers are shown, obviously the number could be increased as necessitated.

The preferred method of forming the connection P is shown in FIGS. 14–17 and comprises the use of die forming apparatus similar to that shown in FIGS. 6 and 7. The apparatus includes die sections 35 and 36 having bore portions 37 and 38 respectively which open into a jointly formed spherical cavity portion 39. The bore portion 37 is closed by the head 40 of an ejection plunger 41 while the bore portion 38 opens through the die 36 to receive a ram 42 which has a chamfered forward edge 43 and is surrounded by a spring 44. An expansible cylindrical core 45 is a compressible between the ram 42 and plunger head 40.

The bore portions 37 and 38 are of like diameters which are greater than the tubular sections to be worked on by the thickness of the walls of such sections. For example, if the tubular sections are of, say, 4 inch outside diameter and have 1/16 inch walls, then the bores 37 and 38 would be 4⅛ inches in diameter. Thus, the tubular sections are expanded throughout their length, the attaching sleeve portions thereof then having inside diameters corresponding to their original outside diameters so that they readily fit over standard pipe sections corresponding to the original diameters of such sections, as shown in FIG. 19.

As shown in FIG. 14, a tubular section 51, with the expansible core 45 therein, is inserted in the bores 37, 38. It will be noted that the core 45 is preferably of substantially the same length as the section 51 and snugly fits therein. The section 51 fits loosely within the bores 37, 38 and upon insertion of the ram 42, the chamfered edge 43 thereof engages and centers the section 51, while further movement of the ram compresses and radially expands the core 45 to expand the section 51 to the walls of the bore 37 and cavity 39, as shown in FIG. 15.

The ram 42 is then withdrawn, the die sections 35, 36 are separated, and the plunger 41 operated so that the head 40 ejects the formed section 51 with the sleeve attaching portion 52 and spherical socket portion 53 formed therein. A second tubular section 55, which may be identical to the original section 51, with the core 45 therein, is inserted in the bore 37 and the formed section 51 is placed in the bore 38. Prior to the reinsertion of the formed section 51, preferably it is provided with a series of openings 54 spaced around the maximum diameter of the spherical portion 53, and prior to insertion of the second section 55, it is coated with lubricant. The dies 35, 36 are then closed so that the spherical portion 53 of the formed section 51 overlaps and surrounds the outer end of the second section 55, as shown in FIG. 16.

The ram 42 is again operated to compress the core 45 and expand the section 55 to the walls of the bore 37 and the inner surface of the spherical portion 53, forming an attachment sleeve 56 and a spherical ball portion 57. The lubricant coating on the section 55 serves to provide the necessary clearance between the ball portion 57 and socket portion 53. The core 45 preferably is formed of a synthetic rubberlike material such as neoprene so as to be unaffected by the lubricant. The dies 35, 36 are again opened, the formed connection P is then ejected by the head 40, and the core 45, having returned to its original size and shape, is readily removed therefrom.

The connection P preferably is finished by chucking it in a lathe and, as shown in FIG. 18, rolling the exterior of the section 55 at the junction of the sleeve and ball portions 56 and 57 by a pressure wheel 59 to form an annular groove 58 to accommodate the edge of socket portion 53 and thereby enable greater angular adjustment between the sections. The finished connection P is then ready for attachment between pipe sections 60, FIG. 19, by insertion of the ends of such sections into the sleeve portions 52 and 56 of the connection. The holes 54 enable lubrication of the ball and socket joint to maintain freedom of adjustment and elimination of foreign matter.

It has been found that by proper operation of the foregoing method, the finished connection P may be formed accurately and without difficulty. The expansion of the tubular sections is formed under such high pressures that the resultant connection becomes a cold forging, forcing it to the limit of its elastic yield and creating a molecular rearrangement of the metal. The lubricant viscosity, pressures and time sequence all play an important part. Greater pressures, rapidly applied, thins the lubricant and creates malformation and seizure between the ball and socket whereas lesser pressures and slower application thereof permits the lubricant to dwell and galls the ball within the socket. Obviously, the viscosity of the lubricant governs the tolerance between the ball and socket.

As an illustrative example of the method, one of the principle uses of the connections P is for joints in exhaust pipes having 4 inch diameters. For this purpose, 4 inch steel pipe sections having $\frac{1}{16}$ inch walls and 4¾ inches in length are employed as the sections 51 and 55. These pipe sections are expanded from 4 inch outside diameters to 4 inch inside diameters with a maximum 5 inch outside diameter for the socket portion 53. To effect this expansion, pressure of approximately 500 tons, or about 50,000 lbs. per square inch, is applied for about 20 seconds. The lubricant, which preferably comprises molybdenum disulfide, has a viscosity of 90 weight at about 70° or room temperature. Obviously, the foregoing factors are variable and differ according to the size of the tubular sections.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. A method of forming a ball and socket connection between adjacent end portions of tubular metal sections, which comprises telescoping the end portion of one metal section within the adjacent end portion of the other metal section, holding the telescoped end portions in rigid and tight relation to each other, inserting a radially expansible member within the telescoped end portion and causing said member to radially expand and spherically deform said portion throughout the overlap and beyond the ends of said telescoping portions with the maximum transverse diameter intermediate the telescoped ends and said ends having a diameter intermediate said maximum diameter and the minimum diameter at the juncture of the spherically deformed portions and the remainder of the tubular metal sections and with the inner telescoped portion snugly engaged spherically within the outer telescoped portion to form a ball and socket metal-to-metal swivel connection between the telescoped portions, whereby a tight seal is maintained within the spherically deformed portions but permitting freedom of angular movement between the tubular sections.

2. The method according to claim 1 wherein the outer of said tubular metal sections is first expanded and spherically deformed, and the inner of said tubular metal sections is then expanded and spherically deformed within the outer section.

3. The method according to claim 2 comprising coating at least one of the mutually engaging surfaces of the overlap portions of said sections with a lubricant prior to expansion to provide clearance between the ball and socket portions.

4. The method according to claim 3 comprising forming holes in the outer section and spaced circumferentially around the maximum diameter of the socket portion.

5. The method according to claim 4 wherein said sections are expanded and spherically deformed by inserting a core of rubber-like material therein and compressing said core axially of said sections to cause said block to radially expand outwardly.

6. A method of forming ball and socket connections between tubular metal sections, comprising radially expanding a first tubular metal section to an inside diameter corresponding to its original outside diameter, whereby it may be fitted over a tube of the same original diameter and spherically deforming one end portion to a greater diameter to form a metal socket having its maximum transverse diameter intermediate the free open end of said socket portion and the juncture of said socket portion with the remaining expanded tubular portion with the free open socket end of greater diameter than said remaining expanded tubular portion, coating with a lubricant at least one end portion of the outer surface of a second tubular metal section of like diameter to the original first section, inserting said coated one end portion of said second section through the free open end into the spherical socket portion of said formed first section with the inserted end of said second section disposed between said maximum transverse diameter of said socket portion and its juncture with the remaining expanded tubular portion, and radially expanding said second section to an inside diameter corresponding to its original outside diameter, whereby it may be fitted over another tube of the same original diameter, and spherically deforming said one end portion outwardly against the inner wall of said spherical socket to form a ball portion within said socket.

7. A method of forming ball and socket connections between tubular metal sections, comprising substantially filling a first tubular metal section with a resiliently compressible radially expansible member, axially compressing and radially expanding said member to radially expand said first section to an inside diameter, whereby it may be fitted over a tube of the same original diameter corresponding to its original outside diameter and spherically deform one end portion to a greater diameter and form a metal socket having its maximum transverse diameter intermediate the free open end of said socket portion and the juncture of said socket portion with the remaining expanded tubular portion with the free open socket end of greater diameter than said remaining expanded tubular portion, decompressing and removing said member from the formed first section, substantially filling with a resiliently compressible radially expansible member a second tubular metal section of like diameter to the original first section, inserting one end portion of said second section through the free open end into the spherical socket portion of said formed first section with the inserted end of said second section disposed between said maximum transverse diameter of said socket portion and its juncture with the remaining expanded tubular portion, axially compressing and radially expanding said member to radially expand said second section to an inside diameter corresponding to its original outside diameter, whereby it may be fitted over another tube of the same original diameter, and spherically deform said one end portion outwardly against the inner wall of said spherical socket to form a ball portion within said socket, decompressing and removing said compressible member from the formed second tubular section.

8. A method of forming ball and socket connections between tubular metal sections, comprising substantially filling a first tubular metal section with a resiliently compressible radially expansible member, axially compressing and radially expanding said member to radially expand said first section to an inside diameter, whereby it may be fitted over a tube of the same original diameter corresponding to its original outside diameter and spherically deform one end portion to a greater diameter and form a metal socket having its maximum transverse diameter intermediate the free open end of said socket portion and the juncture of said socket portion with the remaining expanded tubular portion with the free open socket end of greater diameter than said remaining expanded tubular portion, decompressing and removing said member from the formed section, coating with a lubricant at least one end portion of the outer surface of a second tubular metal section of like diameter to the original first section, substantially filling said second section with a resiliently compressible radially expansible member, inserting said coated one end portion of said second section through the free open end into the spherical socket portion of said formed first section with the inserted end of said second section disposed between said maximum transverse diameter of said socket portion and its juncture with the remaining expanded tubular portion, axially compressing and radially expanding said member to radially expand said second section to an inside diameter corresponding to its original outside diameter, whereby it may be fitted over another tube of the same original diameter, and spherically deform said one end portion outwardly against the inner wall of said spherical socket to form a ball portion within said socket, and decompressing and removing said compressible member from the formed second tubular section.

9. A method of forming ball and socket connections between tubular metal sections, comprising substantially filling a first tubular metal section with a resiliently compressible radially expansible member, axially compressing and radially expanding said member to radially expand said first section to an inside diameter, whereby it may be fitted over a tube of the same original diameter corresponding to its original outside diameter and spherically deform one end portion to a greater diameter and form a metal socket having its maximum transverse diameter intermediate the free open end of said socket portion and the juncture of said socket portion with the remaining expanded tubular portion with the free open socket end of greater diameter than said remaining expanded tubular portion, decompressing and removing said member from the formed section, coating wih a lubricant at least one end portion of the outer surface of a second tubular metal section of like diameter to the original first section, substantially filling said second section with a resiliently compressible radially expansible member, inserting said coated one end portion of said second section through the free open end into the spherical socket portion of said formed first section with the inserted end of said second section disposed between said maximum transverse diameter of said socket portion and its juncture with the remaining expanded tubular portion, axially compressing and radially expanding said member to radially expand said second section to an inside diameter corresponding to its original outside diameter, whereby it may be fitted over another tube of the same original diameter, and spherically deform said one end portion outwardly against the inner wall of said spherical socket to form a ball portion within said socket, decompressing and removing said compressible member from the formed second tubular section and rolling a channellike groove into said second section at the juncture of said ball portion with the remainder of said second section.

10. The method according to claim 1 wherein said telescoped end portions are expanded and spherically deformed simultaneously.

References Cited in the file of this patent

UNITED STATES PATENTS 2,479,702     Rood _____ Aug. 23, 1949

FOREIGN PATENTS 766,741     Great Britain _____ Jan. 23, 1957